United States Patent
Unoki et al.

(10) Patent No.: US 12,482,808 B2
(45) Date of Patent: Nov. 25, 2025

(54) NICKEL ELECTRODE FOR ALKALINE SECONDARY BATTERY AND ALKALINE SECONDARY BATTERY INCLUDING NICKEL ELECTRODE

(71) Applicant: FDK CORPORATION, Tokyo (JP)

(72) Inventors: Syouhei Unoki, Tokyo (JP); Takahiro Endo, Tokyo (JP); Shigekazu Yasuoka, Tokyo (JP)

(73) Assignee: FDK CORPORATION, Tokyo (JP)

( * ) Notice: Subject to any disclaimer, the term of this patent is extended or adjusted under 35 U.S.C. 154(b) by 677 days.

(21) Appl. No.: 17/759,721

(22) PCT Filed: Feb. 4, 2021

(86) PCT No.: PCT/JP2021/004105
§ 371 (c)(1),
(2) Date: Jul. 28, 2022

(87) PCT Pub. No.: WO2021/166662
PCT Pub. Date: Aug. 26, 2021

(65) Prior Publication Data
US 2023/0343927 A1  Oct. 26, 2023

(30) Foreign Application Priority Data
Feb. 21, 2020 (JP) .................. 2020-028569

(51) Int. Cl.
*H01M 4/32* (2006.01)
*H01M 4/24* (2006.01)
(Continued)

(52) U.S. Cl.
CPC ............. *H01M 4/32* (2013.01); *H01M 4/242* (2013.01); *H01M 10/30* (2013.01); *H01M 2004/028* (2013.01)

(58) Field of Classification Search
CPC ........ H01M 4/32; H01M 4/242; H01M 4/366; H01M 2004/028; H01M 10/30
See application file for complete search history.

(56) References Cited

U.S. PATENT DOCUMENTS 6,682,848 B1    1/2004  Yano et al.
2002/0132166 A1  9/2002  Hayashi et al.
(Continued)

FOREIGN PATENT DOCUMENTS

CN    1805185 A    7/2006
EP    3024068 A1   5/2016
(Continued)

OTHER PUBLICATIONS

Extended European Search Report dated Mar. 20, 2025, for corresponding European Patent Application No. 21757459.9, 8, 8 pgs.
(Continued)

*Primary Examiner* — Laura Weiner
(74) *Attorney, Agent, or Firm* — Kinney & Lange, P.A.

(57) ABSTRACT

A battery 2 includes: a container 10; and an electrode group 6 housed in the container 10 together with an alkaline electrolyte liquid 4. The electrode group 6 includes a nickel electrode 14 as a positive electrode and a negative electrode 12 that are combined with a separator 8 interposed therebetween. The nickel electrode 14 includes a positive electrode core and a positive electrode mixture permeated in the positive electrode core. The positive electrode mixture contains nickel hydroxide that is a positive electrode active material. The nickel hydroxide contains a sulfate salt, and a weight rate of a S component contained in the sulfate salt to a Ni component in the nickel hydroxide is 0.28% or more and 1.50% or less.

3 Claims, 5 Drawing Sheets

(51) Int. Cl.
  *H01M 10/30* (2006.01)
  *H01M 4/02* (2006.01)

(56) References Cited

U.S. PATENT DOCUMENTS

| | | | | |
|---|---|---|---|---|
| 2015/0311523 A1* | 10/2015 | Okato | ............... | H01M 4/32 |
| | | | | 429/223 |
| 2017/0141401 A1* | 5/2017 | Imoto | ............... | H01M 4/32 |

FOREIGN PATENT DOCUMENTS

| | | | |
|---|---|---|---|
| JP | 9-147905 | * | 6/1997 |
| JP | H11238509 A | | 8/1999 |
| JP | H11329426 A | | 11/1999 |
| JP | 2001095167 A | | 4/2001 |
| JP | 2003249214 A | | 9/2003 |
| JP | 5339346 B2 | | 8/2013 |

OTHER PUBLICATIONS

International Search Report and Written Opinion dated Mar. 30, 2021, for corresponding PCT Application No. PCT/JP2021/004105.

* cited by examiner

NICKEL ELECTRODE FOR ALKALINE SECONDARY BATTERY AND ALKALINE SECONDARY BATTERY INCLUDING NICKEL ELECTRODE

CROSS-REFERENCE TO RELATED APPLICATION(S)

This application is the national phase of PCT Application No. PCT/JP2021/004105 filed on Feb. 4, 2021, which claims priority to Japanese Application No. 2020-028569, filed Feb. 21, 2020, the contents of which are incorporated herein by reference in their entirety.

BACKGROUND

Technical Field

The present disclosure relates to a nickel electrode for an alkaline secondary battery and an alkaline secondary battery including the nickel electrode.

Background Art

A positive electrode used for an alkaline secondary battery is commonly a nickel electrode. As the nickel electrode, an unsintered nickel electrode is widely used. The unsintered nickel electrode is manufactured by, for example, permeating a positive electrode active material slurry containing nickel hydroxide particles, which are a positive electrode active material, in a nickel foam having a three-dimensional mesh structure (positive electrode core) to be dried, and then press-formed. The unsintered nickel electrode, which can increase a permeation amount of nickel hydroxide, has a large capacity per unit volume, resulting in contribution to increase in a capacity of the alkaline secondary battery.

Alkaline secondary batteries with the increased capacity using the unsintered nickel electrode as above have been used for various use such as electronic devices, electric devices, and hybrid electric vehicles.

Incidentally, when charges and discharges are repeated, the alkaline secondary battery lowers a practically usable charge capacity due to a so-called memory effect. Particularly when shallow discharges are repeated, a discharge voltage decreases with the discharge depth to lower a discharge capacity.

Known to solve such a memory effect is a complete charge followed by complete discharge, a so-called refresh charge-discharge (see Patent Document 1, for example).

PRIOR ART DOCUMENT

Patent Document
Patent Document 1: Japanese Patent Laid-Open No. 2001-095167

SUMMARY

However, the above refresh charge-discharge, which does not prevent occurrence of the memory effect, is not a fundamental solution.

In use such as hybrid electric vehicles, an upper limit and a lower limit of the state of charge (SOC) are set to inhibit overcharge and overdischarge. Thus, it is originally difficult to perform the refresh charge-discharge, and difficult to solve, prevent, or inhibit the memory effect.

Desired is development of an alkaline secondary battery that is not likely to cause the memory effect.

The present disclosure has been made based on the above circumstance, and provides a nickel electrode for an alkaline secondary battery that can reduce the influence of the memory effect and an alkaline secondary battery including the nickel electrode.

The present disclosure provides a nickel electrode for an alkaline secondary battery, the nickel electrode comprising: a positive electrode core; and a positive electrode mixture permeated in the positive electrode core, wherein the positive electrode mixture contains nickel hydroxide being a positive electrode active material, the nickel hydroxide contains a sulfate salt, and a weight rate of a S component contained in the sulfate salt to a Ni component in the nickel hydroxide is 0.28% or more and 1.50% or less.

In a preferable aspect, the nickel hydroxide contains Al as a solid-solution element.

The present disclosure also provides an alkaline secondary battery, comprising: a container; and an electrode group housed in the container together with an alkaline electrolyte liquid, wherein the electrode group includes a positive electrode and a negative electrode that are combined with a separator interposed therebetween, and the positive electrode is any one of the aforementioned nickel electrodes for an alkaline secondary battery.

In a preferable constitution, the negative electrode includes a hydrogen storage alloy.

A nickel electrode for an alkaline secondary battery according to the present disclosure comprises: a positive electrode core; and a positive electrode mixture permeated in the positive electrode core, wherein the positive electrode mixture contains nickel hydroxide being a positive electrode active material, the nickel hydroxide contains a sulfate salt, and a weight rate of a S component contained in the sulfate salt to a Ni component in the nickel hydroxide is 0.28% or more and 1.50% or less. The weight rate of the S component contained in the sulfate salt to the Ni component in nickel hydroxide being 0.28% or more and 1.50% or less can reduce the influence of the memory effect of the alkaline secondary battery. Therefore, the present disclosure can provide a nickel electrode for an alkaline secondary battery that can reduce the influence of the memory effect and can provide an alkaline secondary battery including the nickel electrode.

DETAILED DESCRIPTION

An alkaline secondary battery to which the present disclosure is applied will be described below with reference to the drawings. The alkaline secondary battery to which the present disclosure is applied is not particularly limited. For example, application of the present disclosure to a single-plate nickel-hydrogen secondary battery 2 as illustrated in FIG. 1 (hereinafter, also simply referred to as a battery) will be described.

Figure 1:
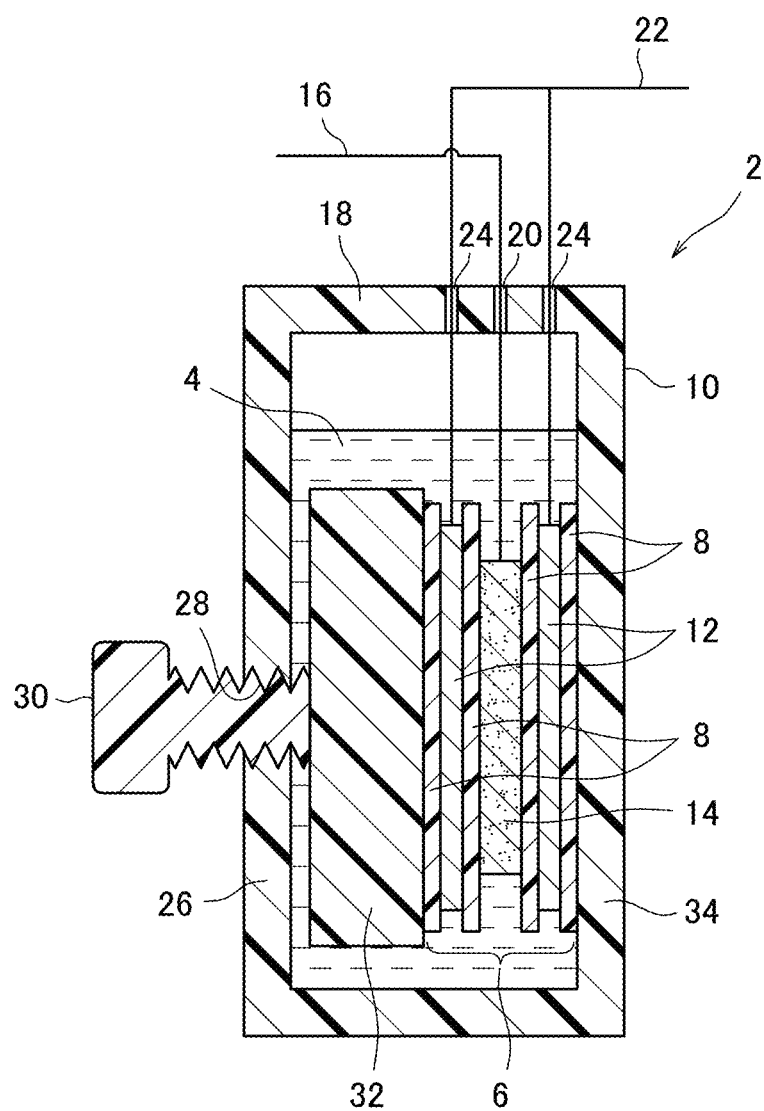
FIG. 1 is a cross-sectional view schematically illustrating a nickel-hydrogen secondary battery according to an embodiment of the present disclosure.

As illustrated in FIG. 1, the battery 2 has a sealable container 10 made of an acrylic resin. In the container 10, an electrode group 6 is disposed together with an alkaline electrolyte liquid 4. As the alkaline electrolyte liquid 4, an electrolyte liquid commonly used for a nickel-hydrogen secondary battery is preferably used. For example, an alkaline electrolyte liquid containing KOH, NaOH, and LiOH as a solute is preferably used.

The electrode group 6 is formed by sandwiching one positive electrode (nickel electrode) 14 by two negative electrodes 12 insulated with separators 8. A positive electrode lead 16 is attached to the positive electrode 14, and the positive electrode lead 16 extends through a through hole for the positive electrode lead 20 provided on an upper wall 18 of the container 10 toward the outside of the container 10. A negative electrode lead 22 is attached to the negative electrode 12, and the negative electrode lead 22 extends through a through hole for the negative electrode lead 24 provided on the upper wall 18 of the container 10 toward the outside of the container 10. The through hole for the positive electrode lead 20 and the through hole for the negative electrode lead 24 have liquid-tightness.

On one side wall 26 of the container 10, an internal thread hole 28 is provided, and a pressure screw 30 fitting with the internal thread hole 28 is disposed. At a tip of the pressure screw 30, a push plate 32 made of an acrylic resin is disposed. The push plate 32 sandwiches the above electrode group 6 with the other side wall 34 of the container 10. Here, turning the pressure screw 30 to advance toward the inside of the container 10 can press the electrode group 6 via the push plate 32. The internal thread hole 28 also has liquid-tightness.

Next, the negative electrode 12 will be described in detail.

The negative electrode 12 has a band-shaped conductive negative electrode core, and the negative electrode core supports a negative electrode mixture.

As the negative electrode core, a sheet-shaped metal material with through holes distributed can be used. Examples thereof include a punched metal sheet and a sintered substrate formed by molding a metal powder to be sintered. The negative electrode mixture is not only permeated in the through holes of the negative electrode core, but also supported on both surfaces of the negative electrode core as layers.

The negative electrode mixture contains hydrogen storage alloy particles that can store and release hydrogen as a negative electrode active material, a conductive material, and a binder. The binder serves to bind the hydrogen storage alloy particles, a negative electrode additive, and the conductive material each other, and also serves to bind the negative electrode mixture to the negative electrode core. As the binder, a hydrophilic or hydrophobic polymer, and the like can be used. As the conductive material, carbon black and graphite can be used. The negative electrode additive is added if necessary.

The hydrogen storage alloy of the hydrogen storage alloy particles is not particularly limited, and an alloy that is used for a common nickel-hydrogen secondary battery is preferably used. A rare earth metal-Mg—Ni hydrogen storage alloy is more preferably used. A composition of the rare earth metal-Mg—Ni hydrogen storage alloy can be freely selected, and for example, an alloy represented by the following general formula is preferably used.

$$Ln_{1-a}Mg_aNi_{b-c-d}Al_cM_d \qquad (I)$$

In the general formula (I), Ln represents at least one element selected from the group consisting of La, Ce, Pr, Nd, Pm, Sm, Eu, Gd, Tb, Dy, Ho, Er, Tm, Yb, Lu, Sc, Y, Zr, and Ti; M represents at least one element selected from the group consisting of V, Nb, Ta, Cr, Mo, Mn, Fe, Co, Ga, Zn, Sn, In, Cu, Si, P, and B; each of the subscripts a, b, c, and d represents a number satisfying a relationship of $0.01 \leq a \leq 0.30$, $2.8 \leq b \leq 3.9$, $0.05 \leq c \leq 0.30$, and $0 \leq d \leq 0.50$, respectively.

The above hydrogen storage alloy particles can be obtained as follows, for example.

First, metal raw materials are weighed so as to have a predetermined composition to be mixed. The mixture is melted, for example, in an induction melting furnace, and then cooled to form an ingot. The obtained ingot is subjected to a heat treatment of maintaining a temperature of 900 to 1200° C. for 5 to 24 hours under an inert gas atmosphere. Thereafter, the ingot is cooled to room temperature, crushed, and sieved to obtain the hydrogen storage alloy particles having a desired particle diameter.

The negative electrode 12 can be manufactured as follows, for example.

First, hydrogen storage alloy powder that is an aggregate of the hydrogen storage alloy particles, the conductive material, the binder, and water are kneaded to prepare a negative electrode mixture paste. The obtained negative electrode mixture paste is applied on the negative electrode core to be dried. After drying, the negative electrode core to which the hydrogen storage alloy particles and the like are adhered is rolled and cut to produce the negative electrode 12. The negative electrode lead 22 is connected to a predetermined position of the negative electrode 12.

The obtained negative electrode 12 is covered with the separator 8. As a material of the separator 8, it is possible to use, for example, a nonwoven fabric made of polyamide fibers to which hydrophilic functional groups are imparted, or a nonwoven fabric made of polyolefin fibers such as polyethylene and polypropylene to which hydrophilic functional groups are imparted. Specifically, a nonwoven fabric mainly formed with polyolefin fibers subjected to a sulfonation treatment to impart sulfone groups are preferably used. Here, the sulfone groups are imparted by treating a nonwoven fabric using an acid including a sulfuric acid group, such as sulfuric acid and fuming sulfuric acid. A battery using the separator 8 including such fibers having sulfone groups exhibits excellent self-discharge characteristics.

Next, the positive electrode 14 will be described in detail.

The positive electrode 14 includes: a conductive positive electrode core having a porous structure; and a positive electrode mixture supported in pores of the positive electrode core.

As such a positive electrode core, a nickel-plated mesh, sponge, or fibrous metal material, or nickel foam can be used, for example.

The positive electrode mixture contains a positive electrode active material, a conductive material, a positive electrode additive, and a binder. The binder serves to bind the positive electrode active material, the conductive material, and the positive electrode additive, and also serves to bind the positive electrode mixture to the positive electrode core. As the binder, carboxymethyl cellulose, methyl cellulose, a PTFE (polytetrafluoroethylene) dispersion, an HPC (hydroxypropyl cellulose) dispersion, and the like can be used, for example.

As the conductive material, one or two or more selected from cobalt compounds such as cobalt oxide (CoO) and cobalt hydroxide (Co(OH)$_2$) and cobalt (Co) can be used, for example. The conductive material is added to the positive electrode mixture, if necessary. The conductive material may be contained in the positive electrode mixture with an addition form of a powder form, or a cover form of covering a surface of the positive electrode active material.

The positive electrode additive is added to improve characteristics of the positive electrode, if necessary. For example, yttrium oxide, zinc oxide, and the like can be used.

As the positive electrode active material, nickel hydroxide is used. The nickel hydroxide contains a sulfate salt, specifically SO$_4$. The sulfate salt is preferably set so that a weight rate thereof to a Ni component in nickel hydroxide is 14.3% or more and 30% or less.

The sulfate salt, which is generated in a manufacturing process of nickel hydroxide described later, is not a substance directly involved with the battery reaction and thus, has been removed as much as possible. However, the present inventors have made intensive investigation to reduce the memory effect of an alkaline secondary battery, and as a result, have found that a larger content of the sulfate salt, which is conventionally reduced as much as possible, comparing to the conventional ones provides good influence on the reduce in the memory effect. Specifically, a weight rate of a S component contained in the sulfate salt to a Ni component in nickel hydroxide of 0.28% or more reduces the memory effect. That is, a larger weight rate of the S component to the Ni component of 0.28% or more in nickel hydroxide can yield more reduction effect of the memory effect. However, when the weight rate of the S component contained in the sulfate salt to the Ni component is more than 1.50% in nickel hydroxide, the capacity of the positive electrode significantly decreases. Thus, an upper limit of the S component contained in the sulfate salt is specified to 1.50% or less.

The positive electrode active material is manufactured by the following procedure, for example.

First, a weighed nickel sulfate is added into water to prepare an aqueous solution containing nickel sulfate. Next, into the obtained aqueous solution with stirring, an aqueous solution of sodium hydroxide is gradually added and allows to be reacted to precipitate nickel hydroxide particles. Here, Al is preferably formed as a solid solution in the nickel hydroxide. To form the Al solid solution, nickel sulfate and aluminum sulfate are weighed so as to obtain a predetermined composition, and added into water to prepare a mixed aqueous solution containing these nickel sulfate and aluminum sulfate.

Next, into the obtained mixed aqueous solution with stirring, an aqueous solution of sodium hydroxide is gradually added and allows to be reacted to precipitate particles mainly containing nickel hydroxide and forming the Al solid solution. The above procedure yields Ni(OH)$_2$ particles. The Ni(OH)$_2$ particles containing the Al solid solution, which have an α-type crystalline structure, form a relatively large space in the crystalline structure; thus, a large amount of the sulfate salt can be contained.

In addition, Yb, Co, and the like preferably form a solid solution in Ni(OH)$_2$. To form the solid solution of these elements, the above mixed aqueous solution is prepared by further adding ytterbium sulfate and cobalt sulfate.

The positive electrode 14 can be manufactured as follows, for example.

First, into a positive electrode active material powder that is an aggregate of the positive electrode active material particles obtained as above, the conductive material, the positive electrode additive, water, and the binder are added. The mixture is kneaded to prepare a positive electrode mixture slurry. The obtained positive electrode mixture slurry is permeated in, for example, a nickel foam to be subjected to a dry treatment. After drying, the nickel foam in which the nickel hydroxide particles and the like are permeated is rolled and then cut. The procedure yields the positive electrode 14 supporting the positive electrode mixture. The positive electrode lead 16 is connected to a predetermined position of the positive electrode 14.

Prepared are a predetermined number of the positive electrodes 14 obtained as above and a predetermined number of the negative electrodes 12 with which the separator 8 is combined obtained as above. One positive electrode 14 is sandwiched between two negative electrodes 12, and a stacked body is formed in this state to obtain the electrode group 6. The electrode group 6 is interposed between the other side wall 34 and push plate 32 in the container 10. Then, the pressure screw 30 is turned to hold the electrode group 6 in the container 10 in a pressured state. Subsequently, a predetermined amount of the alkaline electrolyte liquid 4 is injected into the container 10. Thereafter, the container 10 housing the electrode group 6 and the alkaline electrolyte liquid 4 is sealed with a rubber sealer, which is not illustrated. At this time, the positive electrode lead 16 is disposed so as to extend through the through hole for the positive electrode lead 20 toward the outside of the container 10. The negative electrode lead 22 is also disposed so as to extend through the through hole for the negative electrode lead 24 toward the outside of the container 10. The above procedure yields the battery 2 according to the present disclosure. The obtained battery 2 is subjected to an initial activation treatment to be ready for use.

EXAMPLE

1. Manufacture of Battery

Example 1

(1) Manufacture of Positive Electrode

Nickel sulfate, aluminum sulfate, and ytterbium sulfate, which were starting materials, were weighed so as to have a predetermined composition. The weighed nickel sulfate, aluminum sulfate, and ytterbium sulfate were added into a 1 mol/l aqueous solution of sulfuric acid to prepare a mixed aqueous solution. Into the obtained mixed solution with stirring, a 10 mol/l aqueous solution of sodium hydroxide was gradually added to allow to be reacted. The pH during the reaction was stabilized at 13 to 14 to generate nickel hydroxide particles mainly containing nickel hydroxide and containing a solid solution of Al and Yb. The above procedure yielded nickel hydroxide powder (positive electrode active material powder) that is an aggregate of the nickel hydroxide particles containing the solid solution of Al and Yb.

A part of the obtained nickel hydroxide was separated as a sample for composition analysis and as a sample for crystalline structure analysis. The remainder was used for manufacture of the positive electrode.

A composition analysis of the sample for composition analysis with a high-frequency inductively coupled plasma (ICP) emission spectrometer found that Ni was 41.9%, Al was 3.81%, Yb was 7.38%, and the sulfate salt ($SO_4$) was 10.20%. From the result, the rate of the sulfate salt ($SO_4$) to Ni in the nickel hydroxide particles was found to be 10.20/41.9=24.3%. The sulfate salt ($SO_4$) was formed in the above manufacturing step, and was derived from the starting materials and the aqueous solution of sulfuric acid.

Next, the sample for crystalline structure analysis was analyzed by X-ray diffraction (XRD). A powder XRD instrument (MiniFlex 600, manufactured by Rigaku Corporation) was used for the analysis. Analysis conditions were as follows: an X-ray source was CuKα, a tube voltage was 40 kV, a tube current was 15 mA, a scanning speed was 5 degree/minute, and a step width was 0.02 degrees. From a profile of the analysis results, the nickel hydroxide was found to be $Ni(OH)_2$ having an α-type crystalline structure.

Next, into 100 parts by weight of the positive electrode active material powder obtained as above, 7 parts by weight of a cobalt hydroxide powder, 0.104 parts by weight of an HPC (hydroxypropyl cellulose) powder, 0.28 parts by weight of a PTFE (polytetrafluoroethylene) powder, and 78 parts by weight of water were added. The mixture was kneaded to prepare a positive electrode mixture slurry. The obtained positive electrode mixture slurry was permeated in a sheet-shaped nickel foam as the positive electrode core. Then, the positive electrode mixture slurry permeated in the nickel foam was dried. Thereafter, the nickel foam in which the positive electrode mixture was permeated was rolled to raise an amount of the positive electrode active material per unit volume, and then the rolled product was cut in a square shape with 30 mm in length and 30 mm in width to obtain a positive electrode (nickel electrode) 14. The positive electrode 14 had a thickness of 0.80 mm. A positive electrode lead 16 was welded with a part of the positive electrode 14. The positive electrode 14 had a capacity of 300 mAh.

(2) Manufacture of Negative Electrode

First, La, Sm, Zr, Mg, Ni, and Al were weighed to prepare a mixture with a predetermined ratio of these elements. The obtained mixture was melted in a high-frequency inductive melting furnace in an argon gas atmosphere, the melted product was poured into a mold, and cooled to room temperature to form a hydrogen storage alloy ingot.

Next, the ingot was subjected to a heat treatment of maintaining a temperature of 1000° C. for 10 hours under an argon gas atmosphere. After the heat treatment, the hydrogen storage alloy ingot was cooled to room temperature and mechanically crushed in an argon gas atmosphere to obtain powder of hydrogen storage alloy particles. The obtained powder was sieved to obtain a hydrogen storage alloy powder having a predetermined particle diameter. A particle diameter of the obtained hydrogen storage alloy powder was measured by using a laser diffraction-scattering particle diameter distribution measurement instrument. The hydrogen storage alloy particles had a volume-mean particle diameter (MV) of 65 μm.

A sample collected from the hydrogen storage alloy powder was set in an emission spectrometer, and a composition thereof was analyzed by ICP emission spectroscopy. The hydrogen storage alloy had a composition of $(La_{0.30}Sm_{0.69}Zr_{0.01})_{0.89}Mg_{0.11}Ni_{3.33}Al_{0.17}$.

Into 100 parts by weight of the obtained hydrogen storage alloy powder, 0.2 parts by weight of sodium polyacrylate, 0.04 parts by weight of carboxymethyl cellulose, 1.5 parts by weight of a styrene-butadiene rubber (SBR) dispersion with 50% solid content, 0.3 parts by weight of carbon black, and 22.4 parts by weight of water were added. The mixture was kneaded to prepare a negative electrode mixture paste.

Next, the negative electrode mixture paste was uniformly applied on both surfaces of a perforated plate made of iron as the negative electrode core so as to have constant thicknesses. The perforated plate had a thickness of 60 m and had a nickel-plated surface. The negative electrode mixture paste was permeated also in through holes of the perforated plate. The above procedure yielded an intermediate product of a negative electrode.

After the paste was dried, the intermediate product of the negative electrode supporting the hydrogen storage alloy powder and the like was further rolled to raise the amount of the alloy per volume, and then cut to 35 mm in length and 35 mm in width to obtain a negative electrode 12. The negative electrode had a thickness of 0.25 mm. The negative electrode had a capacity of 540 mAh.

(3) Assembly of Nickel-Hydrogen Secondary Battery

One positive electrode 14 and two negative electrodes 12 obtained as above were prepared. The negative electrodes 12 were covered with separators 8. Then, the negative electrodes 12 covered with the separators 8 were disposed on both sides of the positive electrode 14 and combined to form an electrode group 6. Here, the separator 8 was composed of a nonwoven fabric made of sulfonated polypropylene fibers, and had a thickness of 0.16 mm (basis amount of 55 $g/m^2$). The electrode group 6 was interposed between a push plate 32 and the other side wall 34 in a container 10. Then, a pressure screw 30 was turned to press the electrode group 6 with a torque of 20 kgf·cm.

Separately, an alkaline electrolyte liquid of an aqueous solution containing KOH, NaOH, and LiOH (9.4 N) was prepared.

Next, a predetermined amount of the prepared alkaline electrolyte liquid was injected into the container 10. Then, the container 10 was sealed with a rubber sealer, which is not illustrated, to assemble a nickel-hydrogen secondary battery 2.

(4) Initial Activation Treatment

The battery 2 was left to stand under an environment at 60° C. for 12 hours. Then, with specifying the positive electrode capacity (300 mAh) as 1 It, the battery was charged at 0.02 It for 5 hours, subsequently charged at 0.10 It for 15 hours, then discharged at 0.2 It, and then discharged until a battery voltage reached 1.0 V. The charge-discharge procedure was performed once. The battery 2 was subjected to the initial activation treatment as above to be ready for use.

Example 2

A nickel-hydrogen secondary battery was manufactured in the same manner as in Example 1 except that the ytterbium sulfate was excluded from the starting material for manufacturing the positive electrode active material to change the solid-solution element to be only Al. A composition of the positive electrode active material in Example 2 was analyzed by ICP to be found that Ni was 43.7%, Al was 5.02%, and the sulfate salt was 9.00%. Thus, the rate of the sulfate salt to Ni in the positive electrode active material in Example 2 was 9.00/43.7=20.6%.

Example 3

A nickel-hydrogen secondary battery was manufactured in the same manner as in Example 1 except that the ytterbium sulfate was excluded from the starting material for manufacturing the positive electrode active material and cobalt sulfate was added instead of the ytterbium sulfate to change the solid-solution element to be Al and Co. A composition of the positive electrode active material in Example 3 was analyzed by ICP to be found that Ni was 42.3%, Al was 3.60%, Co was 2.57%, and the sulfate salt was 6.84%. Thus, the rate of the sulfate salt to Ni in the positive electrode active material in Example 3 was 6.84/42.3=16.2%.

Example 4

A nickel-hydrogen secondary battery was manufactured in the same manner as in Example 1 except that the ytterbium sulfate was excluded from the starting material for manufacturing the positive electrode active material and manganese sulfate was added instead of the ytterbium sulfate to change the solid-solution element to be Al and Mn. A composition of the positive electrode active material in Example 4 was analyzed by ICP to be found that Ni was 44.3%, Al was 3.83%, Mn was 2.54%, and the sulfate salt was 6.72%. Thus, the rate of the sulfate salt to Ni in the positive electrode active material in Example 4 was 6.72/44.3=15.2%.

Example 5

A nickel-hydrogen secondary battery was manufactured in the same manner as in Example 1 except that: the ytterbium sulfate was excluded from the starting material for manufacturing the positive electrode active material to change the solid-solution element to be only Al; and an amount of the Al was reduced from that in Example 1 to 3.92%. A composition of the positive electrode active material in Example 5 was analyzed by ICP to be found that Ni was 48.7%, Al was 3.92%, and the sulfate salt was 6.98%. Thus, the rate of the sulfate salt to Ni in the positive electrode active material in Example 5 was 6.98/48.7=14.3%.

Example 6

A nickel-hydrogen secondary battery was manufactured in the same manner as in Example 3 except that: the amount of the added cobalt sulfate of the starting material was adjusted; and the amount of the sulfate salt was increased from that in Example 3 to 8.26%. A composition of the positive electrode active material in Example 6 was analyzed by ICP to be found that Ni was 42.6%, Al was 3.57%, Co was 5.35%, and the sulfate salt was 8.26%. Thus, the rate of the sulfate salt to Ni in the positive electrode active material in Example 6 was 8.26/42.6=19.4%.

Comparative Example 1

A nickel-hydrogen secondary battery was manufactured in the same manner as in Example 1 except that the aluminum sulfate and the ytterbium sulfate were excluded from the starting material for manufacturing the positive electrode active material and cobalt sulfate and zinc sulfate were added instead of the aluminum sulfate and the ytterbium sulfate to change the solid-solution element to be Co and Zn. A composition of the positive electrode active material in Comparative Example 1 was analyzed by ICP to be found that Ni was 53.0%, Co was 0.64% (excluding Co on the surface), Zn was 4.36%, and the sulfate salt was 0.19%. Thus, the rate of the sulfate salt to Ni in the positive electrode active material in Comparative Example 1 was 0.19/53.0=0.4%.

2. Evaluation of Battery (1) Capacity Test

Under an environment at 25° C., the batteries of Examples 1 to 6 and Comparative Example 1 after the activation treatment were charged at 0.1 It for 16 hours, and discharged at 0.2 It until a battery voltage reached 1.0 V. These charge and discharge were repeated until a positive electrode capacity reached the maximum value.

(2) Partial Charge-Discharge Test

After the positive electrode capacity reached the maximum capacity, the battery was charged at 0.1 It for 12 hours, and then completely discharged at 0.1 It (discharged until a battery voltage reached 1.0 V) (initial discharge). Next, the following charge-discharge cycle with SOC of 50% to 110% was repeated to intentionally reproduce the memory effect. The detailed procedure was as follows.

First, the battery was charged at 0.1 It for 12 hours, then discharged at 1.0 C for 0.5 hours (discharged until a battery voltage reached 1.0 V), and charged at 1.0 C for 0.6 hours. These charges and discharge were specified as one cycle, and the cycle was repeated five times in total. Thereafter, the battery was completely discharged at 0.1 It (discharged until a battery voltage reached 1.0 V) (residual discharge).

On the batteries of Examples 1 to 6 and Comparative Example 1, determined were a battery voltage at the initial discharge, a battery voltage at the residual discharge, and a difference between the battery voltage at the initial discharge and the battery voltage at the residual discharge (hereinafter, referred to as the voltage drop at the residual discharge $\Delta V$, or simply referred to as $\Delta V$). Table 1 shows each of the value. It is to be noted that $\Delta V$ was calculated from a difference between an initial discharge at SOC of 40% (at a discharge depth of 60%) and a battery voltage at the residual discharge.

Figure 2:
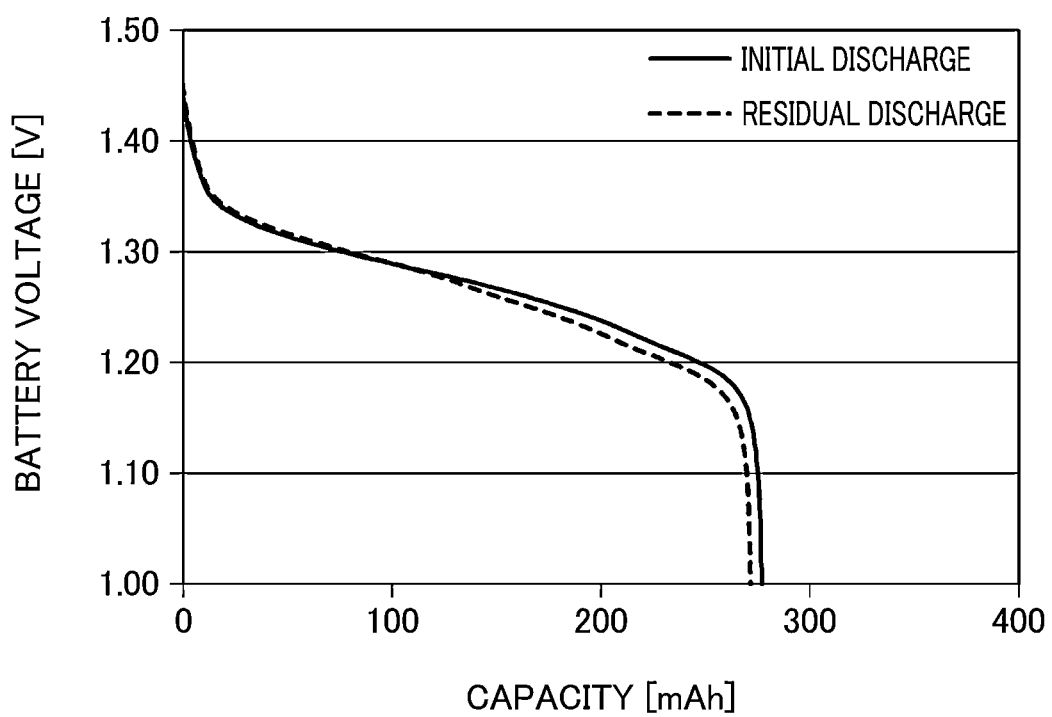
FIG. 2 is a graph indicating a discharge curve before and after a partial charge-discharge test in Example 1.
Figure 3:
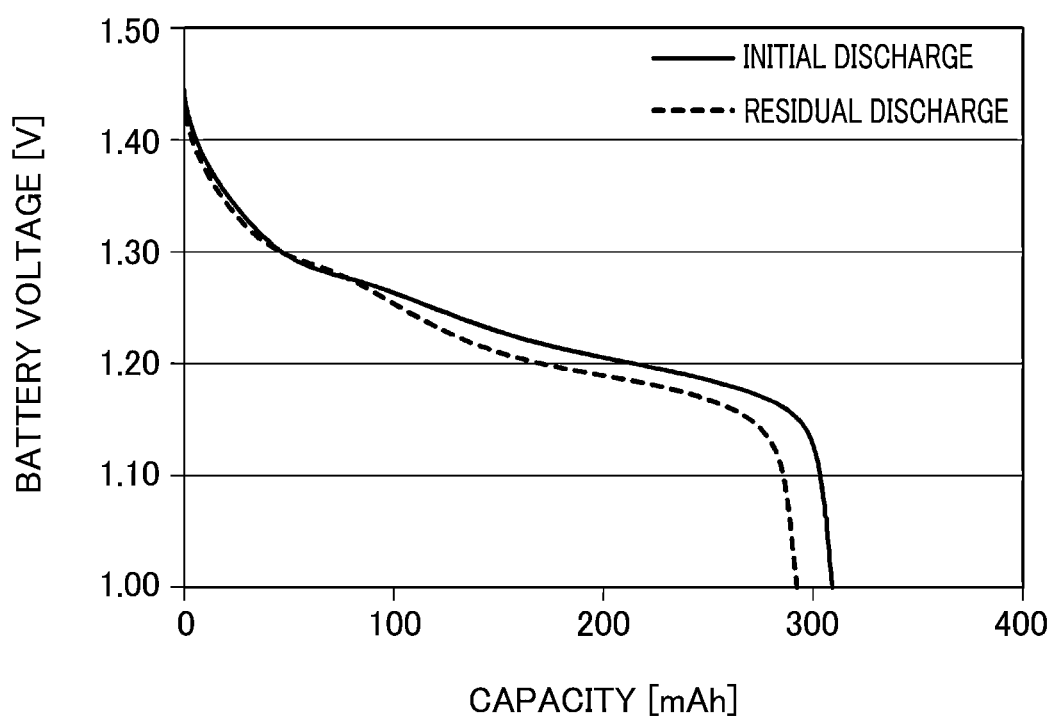
FIG. 3 is a graph indicating a discharge curve before and after a partial charge-discharge test in Comparative Example 1.

For Example 1 and Comparative Example 1, shown in FIG. 2 and FIG. 3 are: a discharge curve indicating a relationship between the battery voltage at the initial discharge and the battery capacity; and a discharge curve indicating a relationship between the battery voltage at the residual discharge and the battery capacity.

3. Analysis of Ni and S

The batteries of Examples 1 to 6 and Comparative Example 1 after the battery evaluation were disassembled to take out each positive electrode from the inside. The taken positive electrode was washed with water, and then left to stand in a vacuum dryer for 12 hours to be completely dried. The positive electrode after the dry treatment was separated into the positive electrode core and the positive electrode active material by using an ultrasonic homogenizer, and then passed through a sieve with an opening of 45 µm for removing the positive electrode core to collect the positive electrode active material powder. Elements in the collected positive electrode active material powder were analyzed by so-called SEM/EDS, which was surface observation with a scanning electron microscope (SEM) and elemental analysis by energy dispersive X-ray spectroscopy (EDS). An acceleration voltage at this time was 15 keV.

Figure 4:
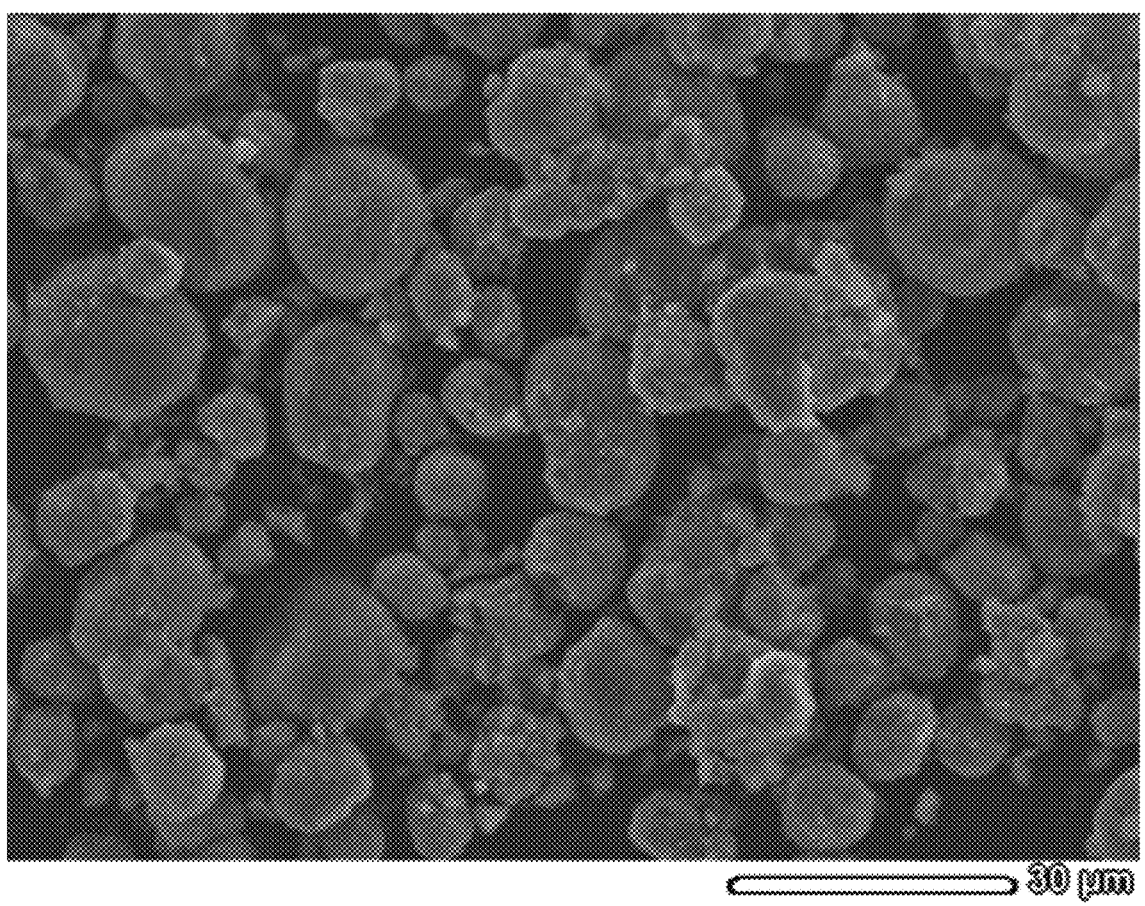
FIG. 4 is a photograph that refers to a drawing illustrating a secondary electron image of a positive electrode active material powder in Example 2 with a SEM.

Mapping analysis on the entire area was performed by EDS based on the SEM image of the analysis result. A magnification was 1000 at this time. With such a degree of the magnification, tens of the active material particles can be observed in the observation field. FIG. 4 is a secondary electron image of the positive electrode active material powder in Example 2 with the SEM as an example. Table 2 shows the analysis results of detected elements in Examples 1 to 6 and Comparative Example 1. It is to be noted that oxygen and carbon were excluded from the analysis target.

From the obtained analysis results, the rate of the S component contained in the sulfate salt to Ni in the nickel hydroxide (positive electrode active material) particles (S/Ni [%]) was calculated. Table 1 and Table 2 show the obtained results.

Figure 5:
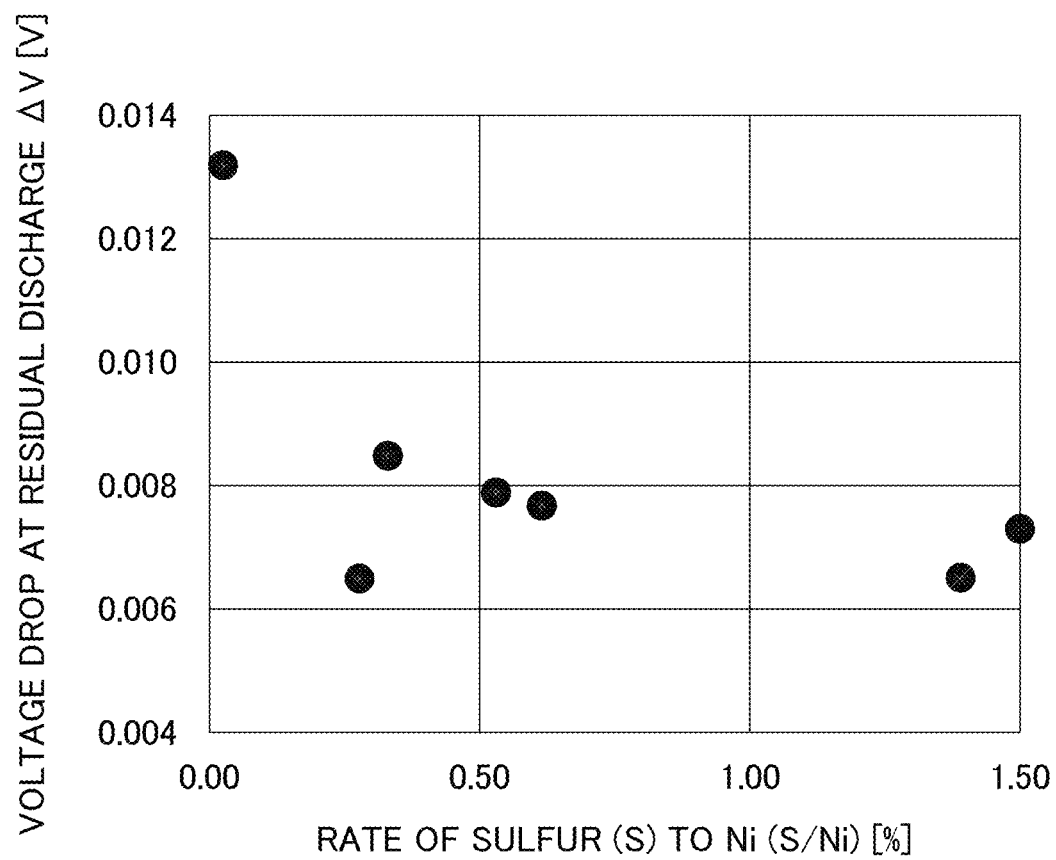
FIG. 5 is a graph indicating a relationship between a rate of S to Ni (S/Ni) and a voltage drop during a residual discharge ($\Delta V$).

FIG. 5 shows a relationship between the S/Ni and ΔV shown in Table 1.

TABLE 1

|  | Rate of sulfur to Ni (S/Ni) [%] | Battery voltage at initial discharge [V] | Battery voltage at residual discharge [V] | ΔV [V] |
|---|---|---|---|---|
| Example 1 | 0.28 | 1.2588 | 1.2523 | 0.0065 |
| Example 2 | 1.39 | 1.2839 | 1.2774 | 0.0065 |
| Example 3 | 0.62 | 1.2572 | 1.2495 | 0.0077 |
| Example 4 | 0.53 | 1.2669 | 1.2590 | 0.0079 |
| Example 5 | 0.33 | 1.2600 | 1.2515 | 0.0085 |
| Example 6 | 1.50 | 1.2354 | 1.2281 | 0.0073 |
| Comparative Example 1 | 0.03 | 1.2112 | 1.1980 | 0.0132 |

TABLE 2

|  | Al [wt %] | S [wt %] | K [wt %] | Mn [wt %] | Co [wt %] | Ni [wt %] | Yb [wt %] | Zn [wt %] | S/Ni [%] |
|---|---|---|---|---|---|---|---|---|---|
| Example 1 | 5.06 | 0.19 | 0.59 |  | 12.26 | 68.18 | 13.72 |  | 0.28 |
| Example 2 | 7.69 | 1.05 | 1.35 |  | 14.45 | 75.47 |  |  | 1.39 |
| Example 3 | 5.02 | 0.47 | 1.03 |  | 17.31 | 76.17 |  |  | 0.62 |
| Example 4 | 5.92 | 0.40 | 1.46 | 4.41 | 12.38 | 75.43 |  |  | 0.53 |
| Example 5 | 5.78 | 0.26 | 0.92 |  | 14.68 | 78.36 |  |  | 0.33 |
| Example 6 | 5.56 | 1.14 | 1.22 |  | 15.93 | 76.15 |  |  | 1.50 |
| Comparative Example 1 | 0.38 | 0.02 | 0.28 |  | 14.35 | 78.62 |  | 6.36 | 0.03 |

4. Discussion

From FIG. 2 and FIG. 3 each indicating the discharge curves at the initial discharge and at the residual discharge after the partial charge-discharge in Example 1 and Comparative Example 1, it is found that the battery voltage decreases during the residual discharge as compared to the initial discharge, and the discharge capacity also decreases. These decreases are the influence of the memory effect. Found from the results in Table 1 and FIG. 5 are as follows. In Comparative Example 1, which contains almost no sulfate salt in the active material and which has an extremely low rate of the S component to the Ni, the value of the voltage drop ΔV at the residual discharge is 0.0132 V. In contrast, in Examples 1 to 6, which have higher rates of the S component to the Ni than in Comparative Example 1, the values of the voltage drop ΔV at the residual discharge are 0.0085 V or lower, and the influence of the voltage drop is reduced. That is, it is found that Examples 1 to 6 reduce the influence of the voltage drop to an approximately half of that in Comparative Example 1. From the result, setting the rate of the S component contained in the sulfate salt to Ni in the nickel hydroxide particles to be 0.28% or more can reduce the influence of the voltage drop due to the memory effect.

The effect of reduction in the influence of the voltage drop due to the memory effect can be obtained with the rate of S to Ni of up to 1.50%. It is to be noted that the rate of the S component should be 1.50% or less because the rate of the S component contained in the sulfate salt to Ni in the nickel hydroxide particles being more than 1.50% relatively increases an amount of the sulfate salt that does not contribute to the battery reaction to cause decrease in the battery capacity.

The present disclosure is not limited to the above embodiments and Examples, and various modifications can be made. For example, the alkaline secondary battery is not limited to the nickel-hydrogen secondary battery and may be another alkaline secondary battery. The mechanical structure is also not particularly limited, and may be a structure other than the single-plate battery, such as a cylindrical battery, a rectangular battery.

EXPLANATION OF REFERENCE SIGNS

2 NICKEL-HYDROGEN SECONDARY BATTERY
6 ELECTRODE GROUP
8 SEPARATOR
10 CONTAINER
12 NEGATIVE ELECTRODE
14 POSITIVE ELECTRODE (NICKEL ELECTRODE)

The invention claimed is:

1. A nickel positive electrode for an alkaline secondary battery, the nickel positive electrode comprising:

a positive electrode core having a conductive porous structure; and a positive electrode mixture, comprising positive electrode active material particles, conductive material, a positive electrode additive, water, and a binder, permeated in the conductive porous structure of the positive electrode core, wherein the positive electrode active material particles comprise nickel hydroxide and an Al solid solution in a crystalline structure, with sulfate salt contained in the crystalline structure of the particles, and wherein a weight ratio of a S component contained in the sulfate salt contained in the particles to a Ni component in the particles is 0.28% or more and 1.50% or less.

2. An alkaline secondary battery, comprising:

a container; and an electrode group housed in the container together with an alkaline electrolyte liquid, wherein the electrode group includes a positive electrode and a negative electrode that are combined with a separator interposed therebetween, and the positive electrode is the nickel electrode for an alkaline secondary battery according to claim 1.

3. The alkaline secondary battery according to claim 2, wherein the negative electrode includes a hydrogen storage alloy.

* * * * *